United States Patent Office 3,496,535
Patented Feb. 17, 1970

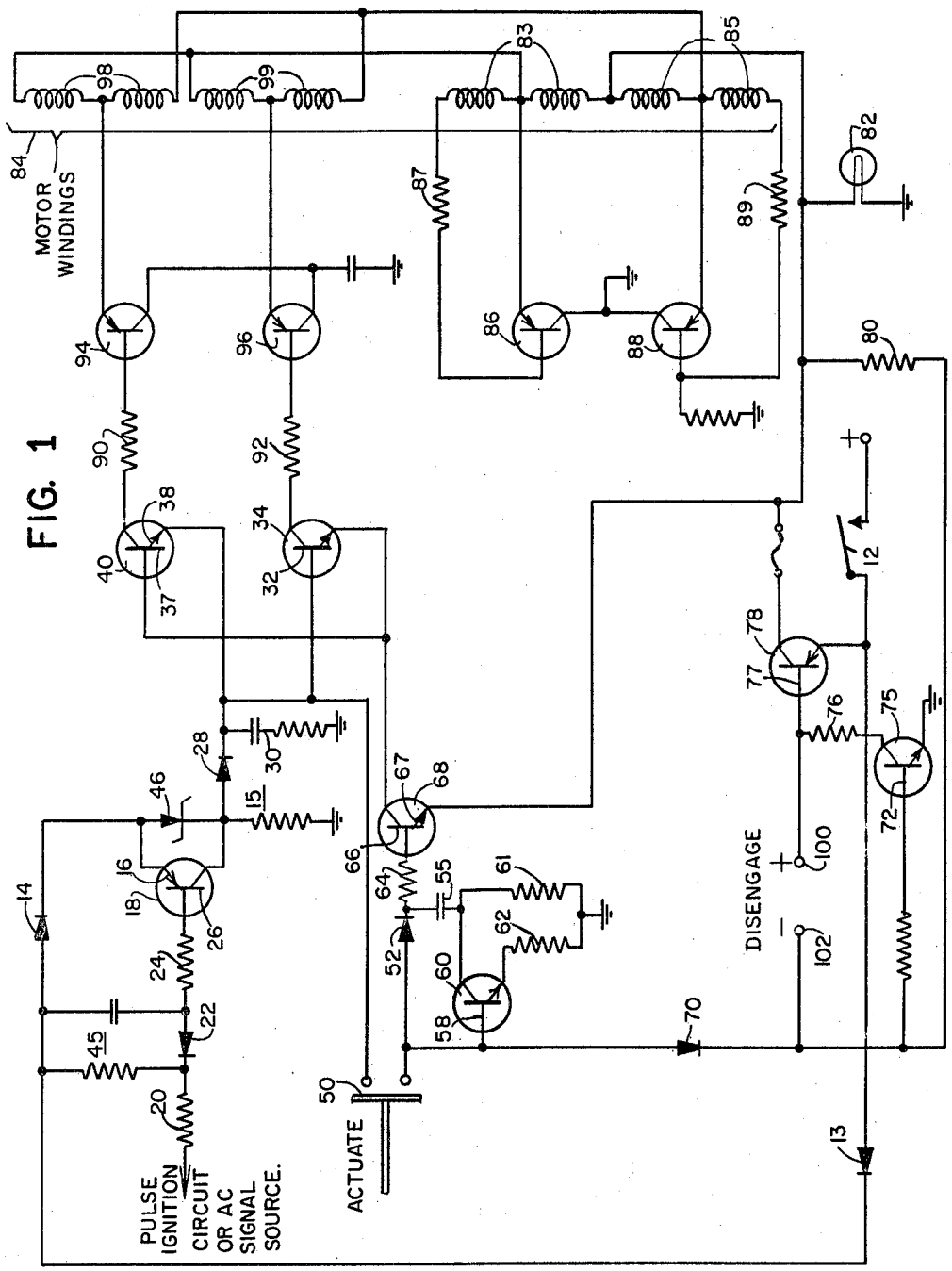

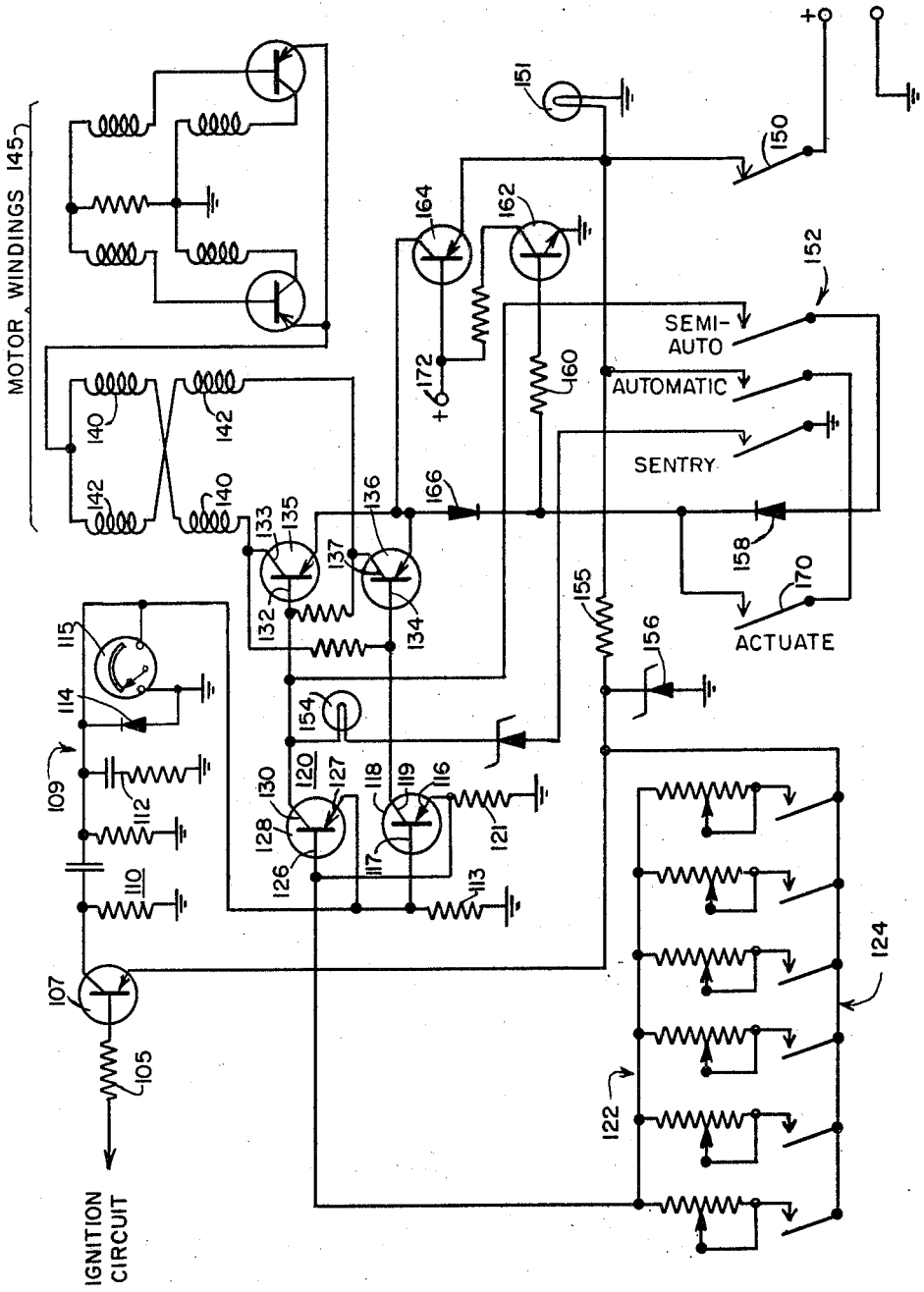

3,496,535
VEHICLE SPEED CONTROL AND
SIGNALLING SYSTEM
Harold Tyzack, Schiller Park, Ill., assignor to Motorola,
Inc., Franklin Park, Ill., a coporation of Illinois
Filed May 5, 1966, Ser. No. 547,836
Int. Cl. B60q 1/00
U.S. Cl. 340—54                                    5 Claims

ABSTRACT OF THE DISCLOSURE

A speed control system for a vehicle which utilizes a tachometer circuit to produce a potential representing the rate of travel of the vehicle, which potential is connected to one control electrode of a bistable multivibrator. A memory capacitor is connected to a second control electrode of the bistable multivibrator and upon activation of the system is instantaneously charged to a potential representing the desired rate of travel of the vehicle. Either the first or second stage of the multivibrator conducts, depending on the speed of the vehicle compared to the desired rate of speed represented by the potential on the memory capacitor, to operate a rate control motor to vary the throttle setting.

---

This invention pertains generally to an electrical system for controlling the rate of movement of a cyclicly moving member, and more particularly to an automatic speed control for an automobile.

Various mechanical and electromechanical speed control systems for vehicles have been proposed. However, in the most part they have required a large amount of valuable "under the hood" space, have been relatively expensive ot manufacture and generally unreliable.

It is an object of this invention to provide an improved system for controlling the rate of travel of a vehicle.

It is another object of this invention to provide a system for controlling the rate of travel of a vehicle that is relatively compact, inexpensive to manufacture and reliable.

The proposed speed control systems generally have one mode of energizing the system such as pressing an activate button when the car is at the desired speed. Although this mode may be acceptable to many people, still others might prefer to have a choice of different modes of operation.

It is a further object of this invention to provide a system for controlling the rate of travel of the vehicle that has a plurality of different modes of operation.

A feature of this invention is a system for controlling the rate of travel of the vehicle having a bistable multivibrator including first and second control electrodes, a first circuit for coupling a potential representing the desired rate of travel of the vehicle to the first control electrode, a second circuit for coupling a potential representing the rate of travel of the vehicle to the second control electrode, a rate control device for varying the rate of travel of the vehicle, and a trigger circuit that is responsive to a potential from the bistable multivibrator to control the rate control device thereby controlling the rate of travel of the vehicle.

Another feature of this invention is a system for controlling the rate of travel of the vehicle wherein the circuit for coupling the potential representing the desired rate of travel to the first control electrode of the bistable multivibrator includes a capacitor that is charged to the desired potential upon energizing the system and maintains that charge until the system is de-energized.

Another feature of this invention is a system for controlling the rate of travel of the vehicle including a circuit for coupling a potential representing the desired rate of travel to a bistable multivibrator and having a plurality of potentiometers each calibrated to develop a potential across the same representing a preselected rate of travel of the vehicle, and a switch for selecting a particular one of the potentiometers and coupling the potential developed thereacross to the first control electrode.

A further feature of this invention is a system for controlling the rate of travel of the vehicle having automatic and semi-automatic operating modes and an actuate button so that with the system in the automatic mode and the actuate button pressed, the system will automatically bring the vehicle up to and maintain the desired rate of travel, and with the system in semi-automatic and energized, the vehicle must be brought up to the desired rate of travel at which point the system will be self-activated to maintain this rate.

In the drawings:

FIG. 1 is a schematic wiring diagram of one of the embodiments of the speed control system of this invention; and FIG. 2 is a schematic wiring diagram of a second embodiment of the speed control system of this invention.

In one embodiment of this invention, the speed control system for a vehicle includes a tachometer circuit which senses the ignition pulses and couples a potential which represents the rate of travel of the vehicle to the first control electrode of a multivibrator. Upon activating the system, a capacitor is charged to a potential which represents the desired rate of travel of the vehicle, and this potential is coupled to the second control electrode of the multivibrator. A switching circuit is coupled between the multivibrator and a reversible motor that provides a rate control function for the vehicle. Which stage of the bistable multivibrator conducts is dependent on whether the speed of the car exceeds the desired rate of speed as represented by the potential on the capacitor or is less than the desired rate of speed. The multivibrator biases the switching circuit to control the direction of movement of the rate control motor to retard, or advance, or hold the throttle to control the rate of travel of the vehicle.

In another embodiment of this invention, a plurality of potentiometers each calibrated to develop a potential across the same representing a preselected rate of travel of the vehicle replaces the capacitor. A switch selects a particular one of the potentiometers and couples the potential developed thereacross to the same control electrode that the potential from the capacitor was coupled. A second mode selector switch determines whether the system will be actuated automatically by pressing an actuate button, or whether it will be actuated semi-automatically by bringing the car up to the speed that is desired to be maintained.

Referring to the drawings, FIG. 1 shows one embodiment of the speed control system of this invention. The system is energized by closing the switch 12 so that battery potential is coupled through blocking diodes 13 and 14 to the resistor-capacitor filter network 45. The potential is regulated by Zener diode 46 and applied to the emitter 16 of transistor 18. In addition, pulses are coupled from the ignition system of the operating vehicle by resistor 20. These pulses are clipped by diode 22 and coupled across resistor 24 to the base 26 of transistor 18. The pulses are phase shifted by transistor 18, coupled by blocking diode 28 to the integrating network 30, which components cooperate to form a tachometer circuit 15 and provide a potential representing the rate of travel of the vehicle at the control or base electrode 32 of transistor 34.

When the actuate switch 50 is closed, the potential from the tachometer circuit 15 is coupled through the switch 50 and blocking diode 52 to charge the capacitor 55 to a potential equal to the potential representing the rate of travel of the vehicle. The capacitor 55 will charge to this potential because when actuate switch 50 is closed, the potential from tachometer circuit 15 is also coupled to the base 58 of NPN transistor 60 which causes this transistor to conduct and connect capacitor 55 through resistor 62 to a reference potential. The resistor 62 is of sufficient size to maintain the potential from tachometer circuit 15 on capacitor 55 until the actual switch 15 is opened.

The potential on capacitor 55 is coupled across resistor 64 to reduce the voltage applied to the base 66 of NPN transistor stage 68. The transistor 68, however, boosts the potential to a level that is substantially equal to the potential from the tachometer circuit 15 at the time the actuate switch 50 was closed, and this potential is coupled to the control electrode or base 37 of transistor 40.

The potential from the tachometer circuit 15 that is applied to the base 58 of transistor 60 is also coupled through blocking diode 70 to the base 72 of NPN transistor 75. The transistor 75 and transistor 78 form a switching circuit, and when this potential is coupled to the base 72 of transistor 75, the transistor 75 is biased into conduction drawing current through the base bias resistor 76 of transistor 78. This reduces the potential on the base 77 of PNP transistor 78 to bias transistor 78 into conduction. When transistor 78 conducts, a potential is applied from the battery through switch 12, to the emitter 67 of transistor 68. This prevents the capacitor 55 from discharging so that it will maintain the potential to which it was charged when the actuate button 50 was closed. Resistor 80 couples the current from transistor 78 back to transistor 75 to maintain the switching circuit in conduction after the actuate button 50 is released, and the potential from the transistor 78 is also coupled across light 82 which lights to indicate that the speed control system has been activated.

The DC current from transistor 78 is coupled through the windings 83 and 85 of a reversible motor 84 to the emitter of PNP transistors 86 and 88 and across base bias resistors 87 and 89 to bias the transistors 86 and 88 into conduction. The reversible motor 84 forms the rate control device of the system and can be coupled, for instance, mechanically to the throttle lever so that the motor, which can be operated in either direction, will move the throttle lever to increase or decrease engine speed.

The transistors 34 and 40 cooperate to form a bistable multivibrator which complete circuits through resistors 90 and 92 to the base electrodes of transistors 94 and 96 which combined form a trigger circuit. The output electrodes of the transistors 94 and 96 are coupled to the direction control windings 98 and 99 respectively of the motor 84. The windings 83, 85, 98 and 99 as illustrated, may be the windings of a shaded pole motor, but it is apparent that motors of other types, either rotary or reciprocating, can be used in the system.

Operation of the system is as follows: With the vehicle in motion the output potential of the tachometer circuit 15 represents the rate of travel of the vehicle at any instant of time. If the operator desires to have automatic speed control, the vehicle is brought up to whatever speed is desired to be maintained, for instance, 50 miles per hour. At this point, the operator presses the actuate button 50 which instantaneously charges the capacitor 55 to the output potential of tachometer circuit 15 at 50 m.p.h. At the same time, the potential is coupled to transistor 75 to actuate that switching circuit to energize the motor 84 through the transistor 78. The condition, therefore, immediately after pressing the button is that the potential on the base 32 and base 37 of the transistors 34 and 40 respectively of the bistable multivibrator will be equal.

Now, if the vehicle should tend to slow below 50 m.p.h., the potential from the tachometer circuit 15 will decrease biasing the transistor 34 of the multivibrator off. The potential on capacitor 55, however, will maintain the transistor 40 in conduction. Transistor 40 biases transistor 94 into conduction to conduct current through the motor windings 98 causing the motor to operate in a direction to act on the throttle to increase the speed of the rate of travel of the vehicle. However, if the rate of travel of the vehicle is greater than 50 m.p.h., the potential from the tachometer circuit 15 will increase above the potential being maintained on capacitor 55. This increased potential will bias "on" transistor 34 but will bias "off" transistor 40. Therefore, the conduction of transistor 34 biases on transistor 96 to conduct current through windings 99 of the motor thereby causing the motor to reverse direction of operation to move the throttle mechanism to decrease the engine speed until the car reaches the desired rate of travel of 50 m.p.h.

The system may be de-energized by either applying a positive potential at point 100 or a negative potential at point 102. Since it is desirable that the system be disengaged if the brakes are applied, the brake light circuit may be used to apply a positive potential at point 100 when the brakes are applied. This positive potential will bias off transistor 78 which acts to remove the DC current from the motor windings to effectively remove any control the motor 84 had over the throttle. At this same time, the potential is removed from the collector 67 of transistor 68 and the charge on capacitor 55 is permitted to discharge through resistor 61 which has a relatively small value to permit rapid discharge of transistor 68. Therefore, upon resumption of speed it will be necessary to once again push the actuate button 50 when the vehicle reaches the speed which it is desired to maintain. The braking action could also couple a negative potential at point 102 in the circuit. If this happens the transistor 75 would be biased off to remove the transistor switching network from the circuit with the results as described above.

It can be seen that the system is composed of small electronic and electrical components that can be compactly mounted to provide an ideal package to be placed "under the hood" of an automobile.

In a second embodiment of this invention shown in FIG. 2, the pulses from the ignition circuit are coupled by resistor 105 to the base of transistor amplifier stage 107. The output of the transistor 107 is coupled to a tachometer network 109 which includes a filter network 110, an integrating network 112 and a clipping diode 114. A tachometer 115 for indicating the engine revolutions may be included in the circuit if desired. The output of the tachometer network 109 is developed across resistor 113 and coupled as in the first embodiment to the control electrode or base 117 of transistor 118, that forms part of the bistable multivibrator 120.

What has been described so far is basically similar to the first embodiment. In place of the capacitor 55 of that embodiment, however, there is substituted a voltage divider including resistor 121 and a plurality of potentiometers 122. Each potentiometer is calibrated so that the potential developed across resistor 121 is equal to a certain rate of travel of the vehicle when it is in the circuit. For instance, the plurality of potentiometers 122 shown in FIG. 2 could be calibrated for 15 m.p.h., 25 m.p.h., 35 m.p.h., 45 m.p.h., 50 and 60 m.p.h. A gang switch 124 may be used to select the potentiometer representing the speed of the vehicle that is desired to be maintained. The potential provided by a selected potentiometer is then coupled to the control or base electrode 126 of transistor 128. This potential is also coupled to the emitter 116 of transistor 118, as the potential from the tachometer circuit 109 is coupled to the emitter 127 of transistor 128 to complete the circuit of the bistable multivibrator 120.

The output (collector) electrodes 130 and 119 of the transistors 128 and 118 of the multivibrator 120 are then coupled to the base electrodes 132 and 134 of the transistors 135 and 136, which form a trigger circuit similar to that trigger circuit formed by transistors 94 and 96 in the first embodiment. The output electrodes 133 and 137 of the transistors 135 and 136 are then connected to the pairs of windings 140 and 142 of the motor 145, which is similar to the motor 84 in the previous embodiment.

This embodiment of the invention is unique in that it provides different modes of operation of the system. The first mode is simply a warning or sentry mode and is not a speed control for the vehicle. In operation, the system is energized by closing the on-off switch 150 which lights lamp 151. Next the gang switch 152 is positioned in the SENTRY position. In this position, a lamp or audible alarm is coupled to what may be termed the "high" side of the bistable multivibrator 120. This high side is that stage of the multivibrator that conducts when the rate of travel of the vehicle exceeds the desired rate of travel as set by the potentiometers 122. When the transistor 128 conducts, it applies a potential across light 154, which can be located on the dashboard, to indicate to the driver that he has exceeded the speed which he wishes to maintain. It will be obvious that an audible alarm device could be connected in the circuit in place of the lamp 154.

In a second mode of operation, the gang switch 152 is placed in the SEMI-AUTOMATIC position. When the "on-off" switch 150 is closed, a potential is coupled from the battery by resistor 155 and regulated by Zener diode 156 to the selected potentiometer 122. For example, if the potentiometer representing 50 m.p.h. is selected, the voltage across resistor 121 will represent this speed and will be coupled to the control electrode 126 of transistor 128. When the vehicle exceeds slightly the desired speed of 50 m.p.h., the potential from the tachometer circuit 110 will exceed the potential developed across the resistor 121 and will place the bistable multivibrator 120 in the operating condition where the transistor 118 will be biased off so that transistor stage 128 will be conducting. With the transistor stage 128 conducting, the potential from the output electrode 130 of that transistor will be coupled through the semi-automatic switch, the blocking diode 158 and across the base bias resistor 160 of NPN transistor 162 to bias that transistor into conduction. Transistor 162 cooperates with the transistor 164 to form a switching circuit similar to the switching circuit formed by transistors 86 and 88 in the first embodiment. With transistor 162 conducting, transistor 164 will conduct to apply a potential through transistor 135 to the motor 145. This potential will drive the motor in a direction to retard the engine throttle thereby reducing the speed of the vehicle to 50 m.p.h. With transistor 164 conducting a potential will be coupled through blocking diode 166 across the transistor 160 back to transistor 162 to maintain the same in conduction. Should the speed of the vehicle drop below 50 m.p.h., the potential across resistor 121 will be greater than the potential from the tachometer circuit 110, therefore the multivibrator 120 will be biased to the second operating state with transistor 116 conducting and transistor 128 biased off. Conduction of transistor 118 will cause transistor 136 to conduct thereby reversing the direction of the motor to advance the throttle of the engine to increase the rate of travel of the vehicle.

In a third mode of operation, the gang switch 152 is placed in the AUTOMATIC position, and the gang switch 124 is moved to select the desired potentiometer representing the rate of travel which is to be maintained, which for illustrative purpose will be 50 m.p.h. When the operator desires to place the automobile under the control of the automatic speed control system, he simply presses the actuate button 170. This couples the potential from the battery through switch 150 to the selected potentiometer as described for the SEMI-AUTOMATIC position. In addition the potential is coupled from the battery through the automatic switch and actuate button 170, across resistor 160, to the base of transistor 162 biasing that transistor into conduction. This in turn biases transistor 164 into conduction which provides a potential to drive the motor. Therefore, if the car were traveling as 20 m.p.h. and the operator pressed the actuate button, the motor would be energized and the car would be brought immediately up to the desired 50 m.p.h. speed. The remaining operation of the system in automatic is the same as described for the semi-automatic.

A similar interlock is provided for this system as was provided in the first embodiment. By applying the brakes, a positive potential is coupled to point 172 which biases off transistor 164 thereby removing the potential from the motor so that it is in effect disconnected from the throttle. If the mode selector switch is in the SEMI-AUTOMATIC position, the car would then have to be brought back up to the selected speed before the system can be actuated. If the mode selector switch 152 is in the AUTOMATIC position, the driver would simply have to push the actuate button 170 to put the car back under the control of the automatic speed control system.

What has been described therefore, is an improved system for controlling the rate of travel of the vehicle that is relatively compact, inexpensive to manufacture and reliable and which provides a plurality of modes for energizing the system.

I claim:

1. A system for controlling the repetition rate of a cyclicly moving member, including in combination, means for producing a potential representing the repetition rate of the member, electron control means having first and second inputs and an output circuit, memory circuit means including a capacitor connected to the first input of said electron control means, switch means for selectively connecting a potential representing the repetition rate of the member to said memory circuit means, first circuit means for connecting a potential representing the repetition rate of the member to the second input of said electron control means, rate control means for controlling the repetition rate of the cyclicly moving member, and second circuit means connecting said rate control means to said output circuit of said electron control means, said switch means being actuated with the cyclicly moving member operated at the desired repetition rate to instantaneously connect the potential representing the repetition rate of the member to said memory circuit means and thereby charging said capacitor with a potential representing the desired repetition rate of the member, said electron control means being responsive to the potential representing the desired repetition rate of the member being coupled to the first input thereof from said capacitor, and the potential representing the actual repetition rate of the member being connected to the second input thereof from said first circuit means to energize said rate control means to control the repetition rate of the cyclicly moving member.

2. A system for controlling the rate of travel of a motor vehicle including in combination, means for producing a potential representing the rate of travel of the vehicle, electron control means having first and second control electrodes and output circuit means, memory circuit means including a capacitor connected to the first control electrode of said electron control means, switch means for selectively connecting a potential representing the rate of travel of the vehicle so said memory circuit means, first circuit means connecting a potential representing the rate of travel of the vehicle to the second control electrode of said electron control means, rate control means for controlling the rate of travel of the vehicle, and second circuit means connecting said rate control means to said output circuit means of said electron control means, said switch means being actuated with the vehicle moving at the desired rate of travel to instantaneously connect the potential representing the rate of travel of the vehicle at that moment to said memory circuit means thereby charging said capacitor thereof with a potential representing the desired rate of travel of the vehicle, said electron control means being responsive to the potential representing the desired rate of travel of the vehicle being coupled to the first control electrode thereof from said capacitor, and the potential representing the actual rate of travel of the vehicle being connected to the second control electrode thereof from said first circuit means to energize said rate control means to control the rate of travel of the vehicle.

3. The system for controlling the rate of travel of a motor vehicle of claim 2 wherein said electron control means includes a bistable multivibrator, and said second circuit means for coupling a signal from said bistable multivibrator to said rate control means includes a switching circuit responsive to a potential from said bistable multivibrator for controlling said rate control means.

4. The system for controlling the repetition rate of a cyclicly moving member of claim 1 wherein said electron control means includes a bistable multivibrator and said second circuit means for coupling a signal from said bistable multivibrator to said rate control means includes a switching circuit responsive to a potential from said bistable multivibrator for controlling said rate control means.

5. The system for controlling the rate of travel of a motor vehicle of claim 2 which vehicle has braking means and further includes electrical interlock means, said electrical interlock means being responsive to the application of the vehicle braking means to disable said rate control means.

References Cited

UNITED STATES PATENTS 3,251,312   5/1966   Livingston _____ 180—105 XR
3,332,406   7/1967   Perry et al. _____ 180—105 XR ALVIN H. WARING, Primary Examiner U.S. Cl. X.R.

180—82, 106; 246—182; 340—62, 263